United States Patent [19]

Komancheck

[11] 3,957,058
[45] May 18, 1976

[54] DETACHABLE MOUNT FOR CONCAVE OF AXIAL FLOW COMBINE

[75] Inventor: John J. Komancheck, New Holland, Pa.

[73] Assignee: Sperry-New Holland, New Holland, Pa.

[22] Filed: Mar. 14, 1975

[21] Appl. No.: 558,507

[52] U.S. Cl. .............................. 130/27 J; 130/27 S
[51] Int. Cl.² .......................................... A01F 12/28
[58] Field of Search .............. 130/27 S, 27 L, 27 J, 130/27 JT, 27 K, 27 R; 56/14.6, 2

[56] References Cited
UNITED STATES PATENTS

| 1,992,172 | 2/1935 | Anderson | 130/27 J |
| 2,298,830 | 10/1942 | McGillis | 130/27 S |
| 2,743,728 | 5/1956 | Carlson | 130/27 J |
| 2,833,288 | 5/1958 | Scranton | 130/27 J |
| 3,101,721 | 8/1963 | Fuller | 130/27 JT |
| 3,209,760 | 10/1965 | Claas | 130/27 JT |
| 3,664,100 | 5/1972 | Rowland-Hill | 130/27 K |
| 3,696,815 | 10/1972 | Rowland-Hill et al. | 130/27 J |

Primary Examiner—Louis G. Mancene
Assistant Examiner—James D. Hamilton
Attorney, Agent, or Firm—C. Hercus Just; Frank A. Seemar; John R. Flanagan

[57] ABSTRACT

An axial flow combine is provided with substantially horizontal rotor units which co-act with concaves that are complementary to the lower portions of said rotor units and are parallel thereto. The front end of the concaves normally are supported by bracket members which are not readily disconnectable from the front end of said concaves. The present invention includes brackets which are readily disconnectable from the front end of said concaves and a support therefor, whereby the concaves may be readily removed from the forward end of the threshing and separating chamber under circumstances where replacement or interchange of the concaves are desired.

7 Claims, 5 Drawing Figures

DETACHABLE MOUNT FOR CONCAVE OF AXIAL FLOW COMBINE

CROSS-REFERENCE TO RELATED APPLICATIONS

This application is one of a limited series of applications file on even dates herewith and respectively pertaining to different improvement inventions applicable generally to an axial flow combine of the type, for example, shown and described in U.S Pat. No. 3,664,100, dated May 23, 1972, and assigned to the same assignee as the instant invention.

BACKGROUND OF THE INVENTION

The present invention pertains to axial flow combines and preferably of the type which employ a pair of threshing and separating rotors which co-act with a pair of concaves respectively associated with the lower portions of the rotors. It occasionally is necessary or desirable to replace or exchange said concaves either for new or different types thereof. In such axial flow combines as are presently in use, it is normal to support the opposite ends of the concaves respectively adjacent opposite sides thereof by bracket means which, in order to free particularly the forward ends of said concaves from the bracket means, a relatively substantial amount of dismounting and disconnection of the supporting means is required.

One example of axial flow combine which employs such normal or conventional type of supporting means for the concaves and especially the forward ends thereof, is illustrated and described in U.S. Pat. No. 3,631,862, dated Jan. 4, 1972. The concave shown in said patent are supported by means permitting a limited amount of vertical adjustment of said concaves relative to the lower portions of the rotors which coact therewith. If it were possible to readily disconnect the supporting means for the forward ends of the concave, it would be a relatively easy and simple operation to remove the concaves from the forward end of the threshing compartment such as under circumstances where it is desired to either replace or exchange said concaves for others. However, the bracket means which support particularly the forward ends of the concaves illustrated in said patent are not readily disengageable from the concaves at least in a manner which provides an unobstructed passage which would permit the ready removal of the concaves from the forward end of the threshing compartment.

SUMMARY OF THE INVENTION

It is the principal object of the present invention to provide detachable mounting means particularly for the forward end of the concaves of an axial flow type combine, whereby upon removing the detachable portions of the supporting means, the concaves then readily may be moved longitudinally, in a forward direction with respect to the threshing and separating chamber of the combine without requiring disassembly of the conventional type of supporting means for the forward end of the concaves as is now required when removal thereof from the forward end of the threshing and separating compartment is desired.

It is another object of the invention to provide a bracket arrangement mounted substantially centrally between the adjacent sides of a pair of concaves in said axial flow turbine, said bracket being supported by transverse mounting means supported adjacent the forward end of said concaves and adjacent the lower portions thereof, said bracket means including an upper part which is separable from a base member which is attached to the transverse mounting means of the combine, said separable part of the bracket having a pair of similar pins projecting rearwardly therefrom with respect to the forward end of the concaves, said pins being slidably received within complementary bushings mounted in the upper portions of the forward faces of said concaves, at the sides thereof which are nearest each other, said detachable part of the bracket being connected to the base member therefor by separable bolt means or the like, whereby upon separating said bracket part from the base member, as well as disconnecting additional simple bracket means which support the outer sides of the concaves, there are not additional obstructions preventing the ready removal of the concaves in a forward direction from the threshing and separting compartment of the combine.

It is still another object of the invention to provide aligning means which extend from the removable bracket member to the base member therefor, said aligning means facilitating the assembly of the removable part of the bracket to said base member to insure proper positioning of the supporting pins carried by the bracket for reception within said aforementioned bushings mounted in the upper portions of the forward faces of the sides of the concaves which are nearest each other.

Details of the foregoing objects and of the invention, as well as other objects thereof, are set forth in the following specification and illustrated in the accompanying drawing comprising a part thereof.

DETAILED DESCRIPTION

Figure 1:
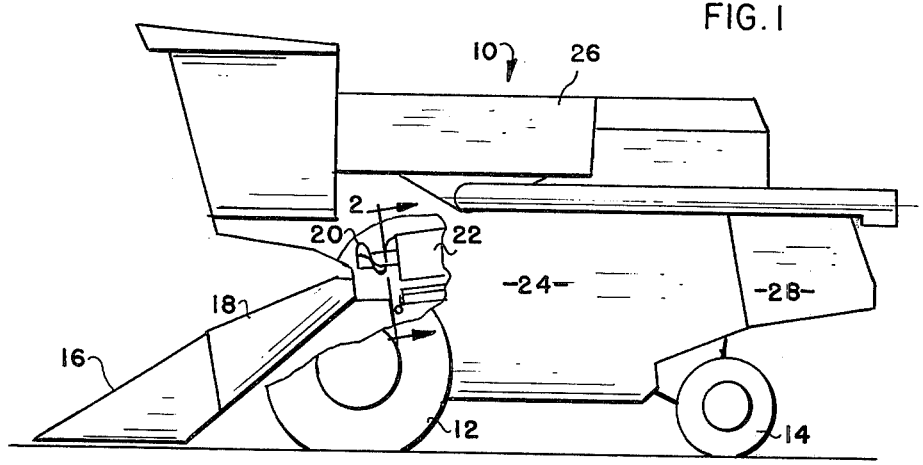
FIG. 1 is a side elevation of an exemplary combine of the axial flow type to which the present invention is applicable, part of said view being broken away to illustrate interior details thereof in the area to which the present invention specifically applies.

Referring to FIG. 1, a combine 10 of the axial flow type is shown in side elevation. As illustrated, the combine is rendered mobile by a pair of forward drive wheels 12 and a pair of smaller diameter rear wheels 14. Mounted on the forward end of the combine, as illustrated, is a header 16 which communicates with an elevator 18, the upper end of which delivers cut crop material which is to be threshed and separated to the augers 20 which are mounted on the forward ends of the rotors 22. Said rotors are positioned within the threshing and separating compartment 24. The threshed and separated grain is conveyed by a suitable conduit to a grain bin 26 supported above the threshing and separating compartment 24 and stalk and/or vine material from which seeds have been threshed is discharged through the discharge end 28 of the combine.

Figure 2:
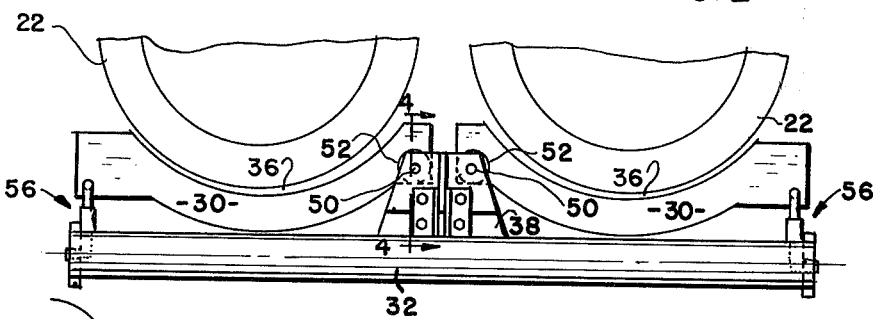
FIG. 2 is a fragmentary, enlarged vertical elevation of the lower portion of the threshing and separating compartment in which the lower portions of the rotors in said compartments as well as the concaves which co-act therewith are illustrated particularly to show the manner in which a central bracket means commonly support adjacent sides of the forward ends of the concaves, said bracket means embodying the principals of the present invention.
Figure 3:
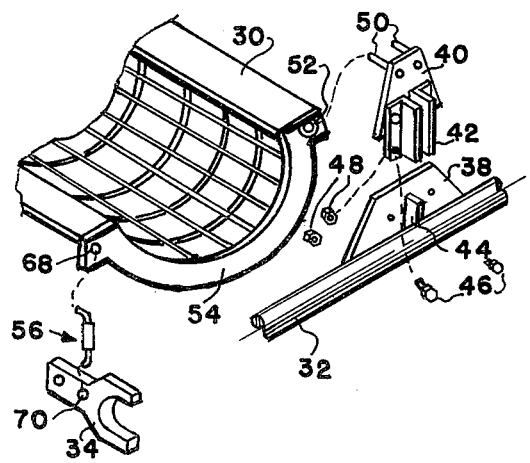
FIG. 3 is a fragmentary exploded view showing the forward portion of one of the concaves illustrated in FIG. 2 and also illustrating in separated manner the several types of bracket means which support said forward end of the concave within the combine.

Referring to FIG. 2, it will be seen that the fragmentarily illustrated forward ends of the rotors 22 co-act with concaves 30, the forward ends of which are also illustrated in FIG. 2. A fragmentarily illustrated forward end of one of the concaves also is shown in FIG. 3. In the type of combine to which the present invention preferably pertains, a pair of rotors 22 are mounted in side-by-side relationship and the same respectively co-act with a pair of concaves 30. For a more extensive illustration of the conventional means by which the concaves of this type of axial flow combine are supported, attention is directed to certain of the figures of U.S. Pat. No. 3,631,862, referred to above. For purposes of the present invention however, it is believed sufficient to state that the rearward ends of the concaves 30, which are not illustrated in the present drawing, are connected to supporting means from which said rearward ends of the concaves readily may be disconnected when the supporting means for the forward ends of the combines have been arranged to permit such removal of the concaves in a forward direction from the threshing compartment of the combine. It also will be understood that the header 16 and elevator 18 are readily removable from the forward end of the combine 10, by conventional means of well known type in this kind of combine, thereby rendering the forward ends of the concaves 30 readily acessible. Accordingly, the present invention primarily is concerned with the supporting means for the forward ends of the concaves 30, a detailed description of which is as follows.

Extending transversely across the forward portion of the threshing and separating compartment 24 is a mounting member 32, the opposite ends of which are supported in elements 34, one of which is shown in FIG. 3, comprising a part of mechanism which is not shown but is adapted to raise and lower the mounting member 32 a limited distance within a vertical plane for purposes of varying the space 36, shown in FIG. 2, between the rotors 22 and concaves 30 within which crop material is threshed. Intermediately of the ends of the mounting member 32 is a base member 38, the upper end of which is complementary to the lower end of a removable bracket 40 which is separably connectable to the base member 38. Bracket 40 also embodies vertical aligning means 42, which are short sections of angles having a limited space between the outwardly projecting flanges thereof for purposes of receiving therebetween and additional single aligning member 44 which is fixed to and projects forwardly from the base member 38. For example, the aligning members 42 may be secured to the lower portion of bracket 40 by suitable bolt means and the downwardly extending projections of the same have holes therein to receive clamping bolts 46 to which nuts 48 are connectable, said nuts and bolts being shown in exploded manner in FIG. 3.

Figure 4:
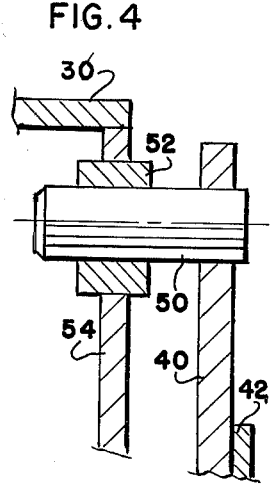
FIG. 4 is a further enlarged fragmentary vertical sectional view showing certain details of the central bracket means as seen on the line 4—4 of FIG. 2.

The principal purpose of the bracket 40 is to support a pair of pins 50 which project rearwardly and respectively are received slidably within bushings 52 mounted within the upper and outer portions of the forward face members 54 of the concaves 30. Said bushings are shown in greater detail in FIG. 4. It thus will be seen that upon disconnecting the bolts 46, bracket 40 may be removed from base member 38 and, as can be visualized from FIG. 2, when said bracket 40 is removed, there is no obstruction at least in the central portion of the forward part of the threshing compartment of the combine to prevent the removal of concaves 30 in a forward direction. It also will be seen that the bracket 40 commonly supports the sides of the concaves 30 which are nearest each other.

Figure 5:
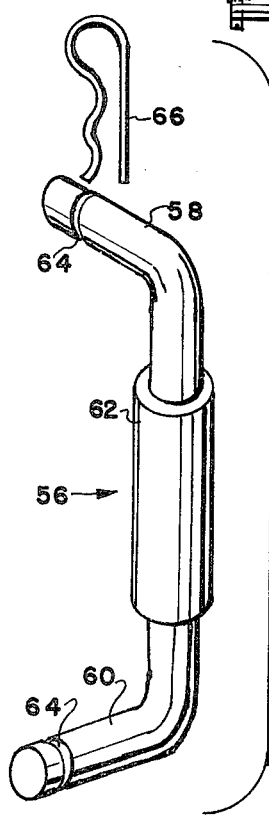
FIG. 5 is a further enlarged perspective exploded view of additional bracket means of the type which support the outer sides of the concaves, securing clips associated with said additional bracket means being illustrated in position to be received in grooves in the opposite ends of said bracket means.

The outer sides of the forward ends of the concaves 30 are supported by additional bracket means 56, one preferred construction of which is illustrated in detail in FIG. 5. Said bracket means include, for example, a pair of right angled rods 58 and 60, one end of each being threaded for reception within a sleeve 62 which is internally threaded, the threads in the opposite ends respectively being in opposite directions and complementary to the oppositedly directed threaded means on said one end of each of the rods 58 and 60. The opposite ends of said rods each have an annular groove 64 therein to receive a heavy duty type removable locking clip 66. The outer ends of the rod 58 respectively are received within holes 68 formed in the forward face member 54 of the concaves adjacent the upper outer side thereof, whereas the outer end of the rod 60 is received within a hole 70 in the element 34. After the insertion of said rods within the respective holes therefor, the locking clips 66 are connected to the grooves 64 to complete the attachment of the additional bracket means to the concaves and thereby innerconnect the same also to the mounting member 32.

From the foregoing, it will be seen that the bracket means 40 and additional bracket means 56 which respectively support the opposite sides of the forward end of the concaves 30 may quickly and easily be connected to or removed from engagement with the forward ends of the concaves 30 and thereby permit the same readily to be removed in a forward direction from the threshing and separating compartment as can be visualized from FIG. 2.

While the invention has been illustrated and described in its several preferred embodiments, it should be understood that the invention is not to be limited to the precise details herein illustrated and described since the same may be carried out in others ways falling within the scope of the invention as illustrated and described.

I claim:

1. In an axial flow combine having a rotor mounted for rotation in the threshing and separating compartment thereof and co-acting with a concave complementary in shape to the lower portion of said rotor, said concave having a forward and rearward end, means in said compartment engageable with the rearward end of said concave to support it operatively relative to said rotor, and a mounting member positioned in said combine adjacent the lower portion of the forward end of said concave and extending transversely across said compartment below the forward end of said concave, the improvement comprising supporting means carried by said mounting member and engageable with the forward end of said concave to support it relative to the forward end of said rotor, said supporting means comprising bracket means extending upward from said mounting member and the upper end of said bracket means and one side of the forward end of said concave having readily detachable interfitting connection means, additional readily detachable interfitting connecting means between said bracket means and said mounting member operable to interconnect said bracket means detachably to said mounting member, and further readily detachable interfitting connecting means between said mounting member and the other side of the forward end of said concave, whereby when said aforementioned interfitting connecting means are disengaged from each other said bracket means may be detached from said mounting member and said concave may be moved forwardly to separate the same from said combine.

2. The combine according to claim 1 in which said bracket means include a base member connected to said mounting member and a bracket member interconnected to said base member, and interfitting aligning means between said base member and bracket member.

3. The combine according to claim 2 in which a pair of said rotors and co-acting concaves are mounted within said threshing compartment of said combine in side-by-side relationship with the front faces thereof commonly within a substantially vertical plane, said base member and detachable bracket member being positioned between the adjacent sides of said pair of concaves and said bracket member having a pair of pins thereon, said adjacent sides of said concaves respectively having similar holes therein to receive said pins, additional supporting means interconnected to said mounting member adjacent opposite ends thereof and having portions quickly detachably connected to and disconnectable from the outer sides of said concaves to free the forward ends of said concaves for unobstructed removal from the forward end of the threshing compartment of the combine, whereby when said bracket is removed from said base member and said additional supporting means are disconnected from said concaves both of said concaves are removable from the forward end of said combine compartment.

4. The combine according to claim 3 in which said base member has one end complementary to one end of said bracket member, and aligning means extend between said base member and bracket member which are adapted to align the same substantially within a vertical plane, and bolt means operable to securely and detachably clamp said bracket member to said base member.

5. The combine according to claim 1 in which said interfitting connecting means between said upper end of said bracket means and one side of said forward end of said concave comprises a pin on said bracket means and hole means in said concave having annular bushing means receiving said pin, said pin being readily withdrawn from said bushing means when said bracket means is removed from said mounting member.

6. The combine according to claim 5 in which said bracket means is substantially parallel to a front face of said concave and said bushing being mounted in said front face of said concave adjacent said one side thereof.

7. The combine according to claim 1 in which said further readily detachable interfitting connecting means between said mounting member and other side of the forward end of said concave comprises rod means extending therebetween and opposite ends of said rod means being bent at angles to said rod means respectively for reception in apertures in said concave and mounting member to detachable connect the opposite side of said concave to said mounting member.

* * * * *